H. BARR.
Churn.

No. 36,935. Patented Nov. 18, 1862.

Witnesses:

Inventor
Hugh Barr
per Munn & Co
Attorneys

UNITED STATES PATENT OFFICE.

HUGH BARR, OF INDEPENDENCE, IOWA.

IMPROVEMENT IN CHURNS.

Specification forming part of Letters Patent No. 36,935, dated November 18, 1862.

*To all whom it may concern:*

Be it known that I, HUGH BARR, of Independence, in the county of Buchanan and State of Iowa, have invented a new and Improved Churn; and I do hereby declare that the following is a full, clear, and exact description of the same, reference being had to the accompanying drawings, making a part of this specification, in which—

Figure 1:
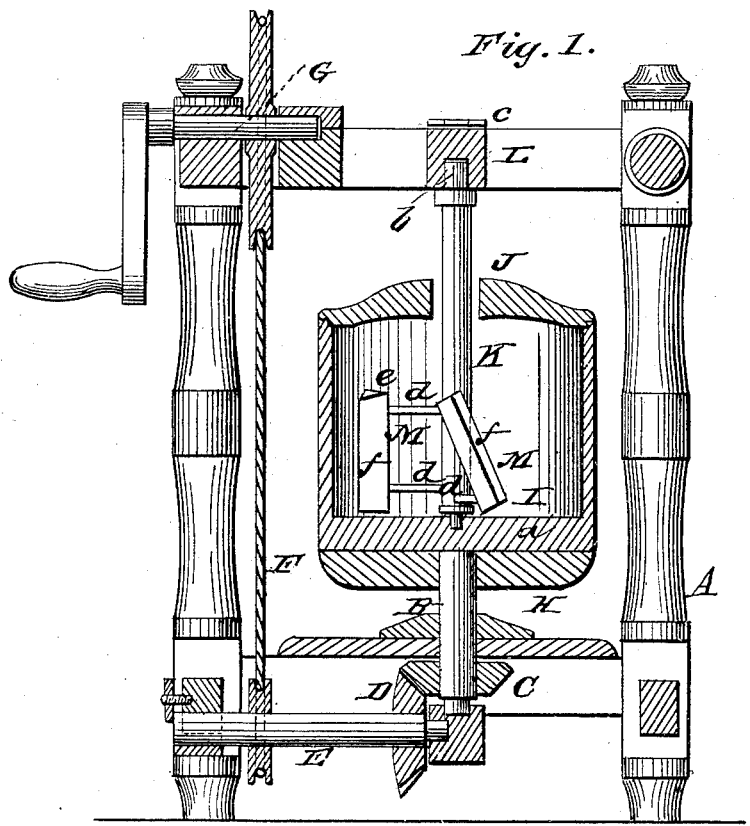
Figure 2:
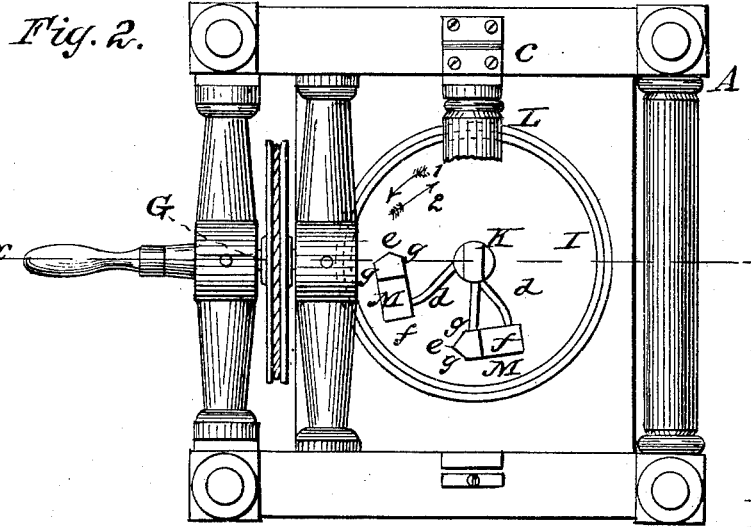

Figure 1 is a sectional elevation of my invention, taken in the line $x\,x$, Fig. 2; Fig. 2 a plan or top view of the same, the top of the churn being removed and a portion of the cross-bar in which the upper end of the brake-shaft is fitted being broken away.

Similar letters of reference indicate corresponding parts in the two figures.

This invention relates to an improved churn of that class in which a revolving cream box or receptacle is employed; and it consists of a revolving cream-box in connection with stationary inclined brakes constructed in such a manner as to favor the rapid production of butter from the cream, and the gathering of the former when produced with the greatest facility.

To enable those skilled in the art to fully understand and construct my invention, I will proceed to describe it.

A represents a frame, which may be constructed in any suitable way, in the lower part of which a vertical shaft, B, is placed centrally. This shaft B has a bevel-wheel, C, on its lower part, which gears into a similar wheel, D, at the inner end of a horizontal shaft, E, which is driven by a belt, F, from a horizontal shaft, G, at the upper part of the frame A, as shown clearly in Fig. 1.

On the upper end of the vertical shaft B there is secured a circular disk or plate, H, on which the cream-box I is placed and secured in any proper way. This cream-box is of cylindrical form, is provided with a lid or cover, J, and has a vertical shaft, K, fitted centrally in it, the lower end of said shaft being stepped in the bottom $a$ of the churn, and passing up through the lid or cover J, is fitted with a square or a tenon, $b$, with two parallel sides into a bar, L, on the upper part of the frame A, one end of said bar being connected by a hinge, $c$, to the frame A, so as to admit of the bar being raised when necessary to release the shaft K, and admit of its being removed from the cream-box I. The shaft K has two brakes, M M, attached to it by horizontal arms $d$. These brakes have an inclined position, as shown more particularly in Fig. 1, and one edge of them is beveled at both sides, forming V-shaped faces $e$ their whole length. (See Fig. 2.) The opposite sides, $f$, are perfectly flat, forming plane surfaces their whole length at right angles to their sides $g$. The lower ends of the brakes just clear the bottom $a$ of the churn, and they extend up about half the height of shaft K, as shown in Fig. 1.

The operation is as follows: The box I is supplied with a requisite quantity of cream, and is then rotated in the direction indicated by the arrows 1, (see Fig. 2,) by turning the shaft G. By this movement of the box I the cream is brought in contact with the V-shaped faces $e$ of the brakes M, and the cream is well agitated, the globules of butter broken, and butter quickly produced, the cream, owing to the V-shaped faces $e$ being forced toward the shaft K and toward the side of the box, and also downward, owing to the inclination of the brakes. When the butter is produced or all separated from the cream, the box I is rotated in the reverse direction, as indicated by the arrows 2, and the butter is gathered in consequence of being brought in contact with the flat sides $f$ of the brakes. These flat inclined surfaces have a tendency to force the butter upward to the surface of the cream, and the former is soon gathered around the shaft K. The shaft K and the brakes M M it will be seen are stationary, and it is not necessary to remove the lid or cover to ascertain when the butter is produced, as the action of the latter against the brakes has a tendency, owing to their inclined position, to elevate the brakes and the shaft K, a small degree of vertical play being allowed the latter. When the box I is rotated in a reverse direction, a contrary effect is produced, and the butter is forced to the top of the cream.

I do not claim, broadly or separately, a rotary cream-box, for they have been previously used; nor do I claim the brakes M M, constructed with V-shaped faces at one side and with flat faces at the opposite side, irrespective of the inclined position of the same; but I do claim as new, and desire to secure by Letters Patent—

The rotary cream-box I, in combination with the stationary brakes M M, provided at one side with V-shaped faces $e$ and at the opposite side with flat faces $f$, when said brakes are placed in an inclined position, as and for the purpose herein set forth.

HUGH BARR.

Witnesses:
 JAMES JAMISON,
 E. B. CANDEE.